United States Patent
Reddy et al.

(10) Patent No.: US 6,554,071 B1
(45) Date of Patent: Apr. 29, 2003

(54) ENCAPSULATED CHEMICALS FOR USE IN CONTROLLED TIME RELEASE APPLICATIONS AND METHODS

(75) Inventors: Baireddy R. Reddy, Duncan, OK (US); Ronald J. Crook, Duncan, OK (US); Dennis W. Gray, Comanche, OK (US); Russell M. Fitzgerald, Waurika, OK (US); Bradley L. Todd, Duncan, OK (US); Steven B. Laramay, Mesquite, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/194,061

(22) Filed: Jul. 12, 2002

Related U.S. Application Data

(62) Division of application No. 09/565,092, filed on May 5, 2000, now Pat. No. 6,444,316.

(51) Int. Cl.⁷ .............................................. E21B 33/14
(52) U.S. Cl. ................. 166/293; 106/802; 106/807; 106/819; 106/823; 166/295; 166/300; 507/219; 507/224; 507/269; 507/902; 524/2; 524/8
(58) Field of Search ............................. 166/293, 295, 166/300; 106/802, 807, 819, 822, 823; 428/403, 407; 507/219, 224, 269, 902; 524/2, 8

(56) References Cited

U.S. PATENT DOCUMENTS

| | | | |
|---|---|---|---|
| 3,163,219 A | 12/1964 | Wyant et al. | |
| 3,420,299 A | * 1/1969 | Cloud | 166/292 |
| 3,766,984 A | 10/1973 | Nimerick | 166/294 |
| 3,952,741 A | 4/1976 | Baker | 128/260 |
| 3,992,317 A | 11/1976 | Brichard et al. | 252/186 |
| 4,036,301 A | * 7/1977 | Powers et al. | 166/295 |
| 4,182,417 A | 1/1980 | McDonald et al. | 166/295 |
| 4,188,447 A | 2/1980 | Ehlenz | 428/310 |
| 4,202,795 A | 5/1980 | Burnham et al. | 252/332 |
| 4,211,668 A | 7/1980 | Tate | 252/316 |
| 4,259,205 A | 3/1981 | Murphey | 252/326 |
| 4,284,433 A | * 8/1981 | Aignesberger et al. | 106/725 |
| 4,343,363 A | 8/1982 | Norton et al. | 166/281 |
| 4,451,387 A | 5/1984 | Tai | 252/174.15 |
| 4,456,067 A | 6/1984 | Pinner, Jr. | 166/279 |
| 4,505,751 A | * 3/1985 | Sydansk | 166/292 |
| 4,506,734 A | 3/1985 | Nolte | 166/308 |
| 4,532,123 A | 7/1985 | Gardner | 424/21 |
| 4,560,486 A | 12/1985 | Hinkel | |
| 4,564,070 A | 1/1986 | Norton | 166/295 |
| 4,604,218 A | 8/1986 | Dawson | |
| 4,610,795 A | 9/1986 | Norris et al. | |
| 4,624,795 A | 11/1986 | Dawson et al. | |
| 4,664,816 A | * 5/1987 | Walker | 507/103 |
| 4,670,166 A | 6/1987 | McDougall et al. | |
| 4,671,972 A | 6/1987 | Schobel et al. | 427/513 |
| 4,693,321 A | 9/1987 | Royer | 137/13 |
| 4,704,213 A | * 11/1987 | Delhommer et al. | 175/72 |
| 4,741,401 A | 5/1988 | Walles et al. | 166/300 |
| 4,756,844 A | 7/1988 | Walles et al. | 252/95 |
| 4,770,796 A | 9/1988 | Jacobs | |
| 4,891,223 A | 1/1990 | Ambegaonkar et al. | 424/408 |
| 4,919,209 A | 4/1990 | King | 166/300 |
| 4,923,753 A | 5/1990 | Walles et al. | 428/402.24 |
| 5,102,558 A | 4/1992 | McDougall et al. | |
| 5,110,486 A | 5/1992 | Manalastas et al. | |
| 5,135,577 A | 8/1992 | Brothers | 106/724 |
| 5,151,131 A | 9/1992 | Burkhalter et al. | 106/822 |
| 5,159,980 A | 11/1992 | Onan et al. | 166/294 |
| 5,164,099 A | 11/1992 | Gupta et al. | |
| 5,187,011 A | 2/1993 | Manalastas et al. | 428/402.24 |
| 5,188,654 A | 2/1993 | Manalastas et al. | 71/28 |
| 5,192,615 A | 3/1993 | McDougall et al. | 428/402.24 |
| 5,204,183 A | 4/1993 | McDougall | 428/402.24 |
| 5,224,544 A | 7/1993 | Tjon-Joe-Pin et al. | 166/295 |
| 5,293,938 A | 3/1994 | Onan et al. | 166/293 |
| 5,370,184 A | 12/1994 | McDougall et al. | 166/278 |

(List continued on next page.)

FOREIGN PATENT DOCUMENTS

| | | |
|---|---|---|
| EP | 0 193 369 A2 | 9/1986 |
| WO | WO 92/12328 | 7/1992 |
| WO | WO 98/40606 | 9/1998 |
| WO | WO 99/61747 | 12/1999 |
| WO | WO 99/63199 | 12/1999 |

OTHER PUBLICATIONS

SPE Paper No. 16900 entitled "An Evaluation of the Effects of Environmental Conditions And Fracturing Fluids Upon the Long–Term Conductivity of Proppants" by G.S. Penny dated 1987.

SPE Paper No. 16901 entitled "Fracturing Treatment Design Improved By Conductivity Measurements Under In–Situ Conditions" by M.A. Parker et al dated 1987.

SPE Paper No. 17541 entitled "Accurate Design of Fracturing Treatment Requieres Conductivity Measurements at Simulated Reservoir Conditions" by B.W. McDaniel et al dated 1988.

CIM/SPE Paper No. 90–89 entitled "Encapsulated Breaker For Aqueous Polymeric Fluids" by M.T. King et al dated 1990.

Invoice dated Apr. 30, 1999.

*Primary Examiner*—George Suchfield
(74) *Attorney, Agent, or Firm*—Craig W. Roddy; C. Clark Dougherty, Jr.

(57) ABSTRACT

Encapsulated water soluble chemicals for use in controlled time release applications, methods of encapsulating the chemicals and methods of using the encapsulated chemicals are provided. The methods of encapsulating the chemicals are basically comprised of forming a first coating of a dry hydrophobic film forming material or a sparingly soluble material which provides a dry shield on the chemical and then forming a second coating of a porous cross-linked hydrophilic polymer on the first coating which prevents the substantial dissolution of the resulting encapsulated chemical for a selected period of time.

31 Claims, No Drawings

U.S. PATENT DOCUMENTS

| | | | |
|---|---|---|---|
| 5,373,901 A | 12/1994 | Norman et al. | 166/300 |
| 5,437,331 A | 8/1995 | Gupta et al. | 166/300 |
| 5,588,488 A | 12/1996 | Vijn et al. | 166/293 |
| 5,591,700 A | 1/1997 | Harris et al. | 507/204 |
| 5,604,186 A | 2/1997 | Hunt et al. | 507/204 |
| 5,613,558 A * | 3/1997 | Dillenbeck, III | 166/293 |
| 5,624,886 A | 4/1997 | Dawson et al. | 507/217 |
| 5,678,632 A | 10/1997 | Moses et al. | 166/307 |
| 5,922,652 A | 7/1999 | Kowalski et al. | 507/127 |
| 5,981,446 A | 11/1999 | Qui et al. | 507/209 |
| 5,981,447 A | 11/1999 | Chang et al. | 507/271 |
| 6,207,620 B1 | 3/2001 | Gonzalez et al. | 507/277 |
| 6,357,527 B1 | 3/2002 | Norman et al. | 166/300 |
| 6,394,185 B1 | 5/2002 | Constien | 166/296 |

* cited by examiner

ENCAPSULATED CHEMICALS FOR USE IN CONTROLLED TIME RELEASE APPLICATIONS AND METHODS

CROSS-REFERENCE TO RELATED APPLICATION

This is a divisional of application Ser. No. 09/565,092 filed on May 5, 2000, now U.S. Pat. No. 6,444,316.

BACKGROUND OF THE INVENTION

1. Field of the Invention

This invention relates to encapsulated water soluble chemicals for use in controlled time release applications, methods of encapsulating the water soluble chemicals and methods of using the encapsulated chemicals.

2. Description of the Prior Art

Water soluble particulate solid chemicals encapsulated with coatings of polymers and the like have been utilized heretofore. The encapsulating coatings on the water soluble chemicals have been utilized to control the times when the chemicals are released in aqueous fluids. For example, encapsulated particulate solid chemicals have been used in oil and gas well treating fluids such as hydraulic cement slurries, formation fracturing fluids, formation acidizing fluids and the like.

The methods of coating water soluble particulate solid chemicals have generally involved spray coating a solution of a polymer and a cross-linking agent onto the particulate solids while simultaneously fluidizing the solids with a hot gas such as air or nitrogen. The hot gas causes the polymer to cross-link and evaporates the water from the polymer solution leaving a porous film of cross-linked polymer on the particulate solids. When the coated solids are placed in an aqueous fluid, the water passes through the porous polymer film and dissolves the water soluble chemical inside. The time required for the water to pass through the polymer coating depends on its thickness, i.e., the thicker the polymer coating, the longer it takes for the water soluble chemical to leach out of the coating.

A problem has been encountered when using the prior art methods as described above to encapsulate hygroscopic or otherwise surface wet particulate solids. That is, because of the presence of the water, the sprayed on polymer solution in the presence of hot gas often fails to produce a dry encapsulating polymer coating on the solids. Problems have also been encountered when dry particulate solid chemicals which are chemically incompatible with the encapsulating polymer are encapsulated. That is, the incompatible chemicals prevent or quickly deteriorate the polymer coatings.

An example of a need for improved encapsulated chemicals in well operations involves primary cementing in deep water offshore wells. Hydraulic cement compositions are used in primary cementing operations whereby casing and other pipe strings are cemented in well bores. That is, a hydraulic cement composition is pumped into the annular space between the walls of a well bore and the exterior of a pipe string disposed therein. The cement composition is permitted to set in the annular space thereby forming an annular sheath of hardened impermeable cement therein. The objective of the cement sheath is to physically support and position the pipe string in the well bore and bond the pipe string to the walls of the well bore whereby the undesirable migration of fluids between zones or formations penetrated by the well bore is prevented.

Primary cementing operations in deep water offshore wells are particularly difficult in that they are carried out in well bores which penetrate formations between the sea floor or mud line and a depth generally under about 2,000 feet below the mud line. Such formations are often not well consolidated, readily fracture and often have highly pressured water flows therethrough. Another problem is the temperature at which the cement composition must set. Deep water off shore wells typically have sea bottom temperatures ranging from about 32° F. to 55° F. depending on their geographical location. The cement compositions utilized for performing cementing operations at such temperatures must set and provide enough compressive strength to proceed with drilling without involving long waiting on cement (WOC) times, preferably less than 24 hours. Accordingly, the cement compositions must include set and strength accelerating agents to allow the cement compositions to set at the low temperatures involved and to develop early compressive strengths. However, a problem in the use of cement set and strength accelerating agents is that they often cause the cement compositions to have thickening times which are too short to allow placement of the cement compositions in the formations or zones to be cemented. Thus, the cement compositions used in deep off shore wells must have adequate pumping times to allow placement, but at the same time they must set and develop sufficient compressive strengths to allow further drilling as quickly as possible.

In cementing high temperature wells which shorten the thickening times of cement compositions, a cement set retarder must be added to the cement composition to allow adequate placement time. The presence of the set retarder lengthens the WOC time of the cement composition making it necessary to add a set and strength accelerating agent to the cement composition if the WOC time is to be reduced. The presence of the set and strength accelerating agent in the cement composition increases the risk that the cement composition may thicken or set before placement.

Particularly suitable cement set and strength accelerating agents are calcium salts such as calcium chloride. If such set and strength accelerating agents were encapsulated whereby their release in cement compositions would take place after the safe placement of the cement compositions in the formations or zones to be cemented, the WOC times could be shortened appreciably. However, because calcium chloride and other similar salts are hygroscopic, effective controlled time release encapsulation has heretofore not been possible.

Another example of a need for improved encapsulated chemicals in well operations involves dissolving drilling fluid filter cake and the like in well bores penetrating subterranean producing formations with acid or acid forming chemicals. Oil and gas wells are commonly drilled utilizing water or oil based drilling fluids. During the drilling process substantial damage to the well bore surfaces adjacent to producing formations takes place. The damage is usually in the form of a build-up of drilling fluid filter cake and gelled drilling fluid on the surface of the well bore and in the near-well bore porosity of adjacent producing formations. Unless removed, the presence of the filter cake and gelled drilling fluid hinders the flow of oil and gas into the well bore. Heretofore, the filter cake and gelled drilling fluid have been removed by the expensive and time consuming process of circulating a corrosion inhibited aqueous acid solution through the well bore and into contact with the drilling fluid and gelled drilling fluid whereby they are dissolved. An encapsulated acid or acid producing chemical which could be released adjacent to the producing formations after placement would save considerable time and money.

Thus, there are continuing needs for improved encapsulated water soluble chemicals useful in controlled time release applications, improved methods of encapsulating water soluble chemicals and methods of utilizing the encapsulated chemicals.

SUMMARY OF THE INVENTION

The present invention provides methods of encapsulating chemicals for use in controlled time release applications, encapsulated water soluble chemicals and methods of using the encapsulated chemicals which meet the above described needs and overcome the deficiencies of the prior art. The methods of this invention for encapsulating water soluble particulate solid chemicals basically comprise the following steps. A first coating is formed on the particulate solid chemical which is a dry hydrophobic film forming material or a dry sparingly soluble material. The hydrophobic material or the sparingly soluble material is present in the first coating in an amount such that it provides a dry shield on the encapsulated chemical and preferably provides a short delay in the release of the encapsulated chemical in the presence of water. A second coating is next formed on the first coating which is a porous cross-linked hydrophilic polymer. The porous hydrophilic polymer is present in the second coating in an amount such that when contacted with water it prevents the substantial dissolution of the encapsulated chemical for a selected time period.

An improved method of cementing a pipe string in a well bore of this invention is comprised of the following steps. A cement composition is prepared comprised of a hydraulic cement, water and a controlled time release encapsulated cement set and strength accelerating chemical. The set and strength accelerating chemical has a first coating of a hydrophobic film forming material or a sparingly soluble material which provides a dry shield on the encapsulated chemical and preferably provides a short delay in the release of the encapsulated chemical in the presence of water. A second coating of a porous cross-linked hydrophilic polymer is formed on the first coating which prevents the substantial dissolution of the encapsulated chemical in water for a selected period of time. After its preparation, the cement composition is placed in the annulus between the pipe string and the well bore. Thereafter, the cement composition is allowed to set into a hard impermeable mass in the annulus.

An improved method of dissolving drilling fluid filter cake and the like in well bores penetrating subterranean producing formations is comprised of the following steps. A cleaning composition comprised of water and a controlled time release encapsulated particulate solid acid or acid forming chemical is prepared. The encapsulated particulate solid acid or acid forming chemical has a first coating of a hydrophobic film forming material or a sparingly soluble material which provides a dry shield on the encapsulated particulate solid acid or acid forming chemical and provides a short delay in the release of the acid or chemical in the presence of water. A second coating of a porous cross-linked hydrophilic polymer is formed on the first coating which prevents the substantial dissolution of the encapsulated acid for a selected period of time. After its preparation, the cleaning composition is placed in the well bore adjacent to the subterranean producing formations to be cleaned. Thereafter, the cleaning composition is allowed to react with and remove said filter cake and the like.

It is, therefore, a general object of the present invention to provide improved encapsulated water soluble chemicals for use in controlled time release applications and methods of making and using such encapsulated chemicals.

Other and further objects, features and advantages of the present invention will be readily apparent to those skilled in the art upon a reading of the description of preferred embodiments which follows.

DESCRIPTION OF PREFERRED EMBODIMENTS

The encapsulated time release chemicals and methods of this invention are useful in a variety of applications. The term "controlled time release" is used herein to mean that a chemical encapsulated in accordance with this invention will release at a known rate into an aqueous solution in which it is mixed in a selected time period. While any of a great variety of chemicals can be encapsulated in accordance with this invention and used in a variety of applications, the encapsulated chemicals and methods are particularly suitable for use in oil and gas well operations. Further, the encapsulated chemicals and methods of this invention are particularly suitable for encapsulating hygroscopic chemicals, but they also provide excellent encapsulation and time release for dry particulate solid chemicals.

The methods of this invention for encapsulating a deliquescent, hygroscopic or non-hygroscopic, water soluble, particulate solid chemical for use in controlled time release applications are basically comprised of the following steps. A first coating of a dry hydrophobic film forming material or a sparingly soluble material is formed on the chemical. The hydrophobic or sparingly soluble material is present in the first coating in an amount such that it provides a dry shield on the chemical and provides a short delay in the release of the chemical in the presence of water. A second coating is then formed on the dry first coating comprised of a porous cross-linked hydrophilic polymer. The porous cross-linked hydrophilic polymer is present in the second coating in an amount such that when contacted with water it delays the substantial dissolution of the encapsulated chemical for a selected period of time.

Examples of hygroscopic particulate solid chemicals which are useful in oil and gas well operations and treatments include, but are not limited to, cement set and strength accelerators such as calcium chloride, calcium acetate, calcium nitrite and ammonium chloride. Examples of non-hygroscopic water soluble particulate solid chemicals useful in well operations and treatments include, but are not limited to, oxidizing agents such as sodium chlorate, ammonium persulfate, sodium perborate, and solids such as sulfamic acid, citric acid and hydrogen sulfate salts.

When a water soluble particulate solid chemical to be encapsulated in accordance with this invention is either hygroscopic or incompatible with the release delaying polymer coating, the first coating is preferably formed of a dry hydrophobic material selected from the group consisting of styrene-butadiene rubber latex, waxes such as low melting polyolefin waxes, oils, polybutylene and atactic polyolefins. Of these, styrene-butadiene rubber latex is the most preferred.

Styrene-butadiene rubber latex is an aqueous suspension of particles of styrene-butadiene copolymers. The latex suspension usually includes water in an amount in the range of from about 40% to about 70% by weight of the latex composition, and in addition to the suspended styrene-butadiene particles, the latex often includes small quantities of an emulsifier, polymerization catalysts, chain modifying agents and the like. The weight ratio of styrene to butadiene in the latex can range from about 10%:90% to 90%:10%. A particularly suitable styrene butadiene aqueous latex has a styrene:butadiene weight ratio of about 25%:75%, and the styrene-butadiene copolymer is suspended in a 50% by weight aqueous emulsion. A latex of this type is available, for example, from Mallard Creek Polymers, Charlotte, N.C. under the tradename "ROVENE™."

The hydrophobic material is preferably applied to a hygroscopic particulate solid chemical by spray coating an aqueous solution of the hydrophobic material onto the particulate solid chemical while simultaneously fluidizing the solid particles with a hot gas such as air or nitrogen. The hot gas evaporates some or all of the water from the coating solution leaving a porous coating of dry hydrophobic material on the chemical. When the hydrophobic film forming material is a rubber latex such as styrene-butadiene rubber latex, the hydrophobic film forming material becomes porous during the drying process.

The dry hydrophobic coating is generally present in the first coating placed on the particulate solid chemical in an amount in the range of from about 1% to about 25% by weight of the encapsulated chemical, more preferably an amount in the range of from about 10% to about 20%, whereby when the first coating is in contact with water it releases the chemical encapsulated thereby in a time period of less than about 2 hours.

The first coating formed on a hygroscopic material can also be formed of a sparingly soluble material. When a sparingly soluble material is utilized it can be sprayed on the particulate solid chemical in the presence of a hot fluidizing gas as described above. Alternatively, a first coating of a sparingly soluble material can be formed by reacting an outer layer of the particulate solid chemical to be encapsulated with a reactant that forms a sparingly soluble material. For example, when calcium chloride (a hygroscopic chemical) is to be encapsulated, the reactant can be sodium carbonate which reacts with an outer layer of the calcium chloride to form a first coating of sparingly soluble calcium carbonate thereon. When the particulate solid chemical is an oxidizing agent such as an alkali metal peroxide, an outer layer of the peroxide can be reacted with water soluble salts of barium or magnesium to form a first coating of sparingly soluble barium or magnesium peroxide. The reactant can be sprayed onto the particulate solid chemical while simultaneously fluidizing the chemical particles with hot gas as described above whereby a dry first coating is formed on the chemical.

Examples of dry sparingly soluble materials which can be utilized to form the first coating on a particulate solid chemical in accordance with this invention include, but are not limited to, carbonate, phosphate or sulfate salts of metals such as magnesium, barium, calcium, zirconium and the like. The sparingly soluble material in the first coating is generally present in an amount in the range of from about 1% to about 25% by weight of the encapsulated chemical, more preferably an amount in the range of from about 10% to about 20%, whereby the first coating releases the encapsulated material when in contact with water in a time period of less than about 2 hours.

While various hydrophilic polymers which can be utilized for forming the second encapsulating coating on the first coating described above, preferred such polymers comprise partially hydrolyzed acrylic polymers, preferably in an aqueous based form, which are cross-linked with either an aziridine prepolymer or a carbodiimide. More particularly, the term partially hydrolyzed acrylic polymers as used herein means any of the vinyl acrylic latex polymers containing from about 0–60% by weight monovinyl aromatic content as styrene, from about 5–25% by weight alpha, beta unsaturated carboxylic acid content and from about 15–95% by weight alkyl acrylate or methacrylate ester content. The unsaturated carboxylic acid can comprise, for example acrylic acid or methyl acrylic acid or mixtures thereof. The alkyl acrylate or methacrylate ester can comprise, for example, ethyl butyl or 2-ethylhexylacrylate, methyl, butyl or isobutyl methacrylate or mixtures thereof. The vinyl acrylic latex polymers are stabilized by the addition of appropriate nonionic or anionic/nonionic surfactant systems in accordance with well known methods for preparing and stabilizing latex polymer systems. Vinyl acrylic latex polymers of the type described above are commercially available from, for example, Rohm and Haas Company, Philadelphia, Pa. or S.C. Johnson Wax, Racine, Wis.

The aziridine prepolymer can comprise, for example, pentaerythritol-tris-[.beta.-(aziridinly) propionate]. The carbodiimide can comprise, for example, 1,3-dicyclohexylcarbodiimide.

The partially hydrolyzed acrylic polymers are optionally admixed with a particulate micron sized material such as silica prior to or simultaneously with the coating of the encapsulated chemical. The use of silica in the coating composition is preferred when water-soluble oxidizer chemicals which can potentially degrade a polymeric coating are encapsulated. It is also believed that the presence of silica in the coating composition also aids in introducing imperfections in the dry coating to facilitate the controlled release of the encapsulated chemical. The partially hydrolyzed acrylic polymers are admixed with the particulate silica in an amount such that the particulate silica comprises from about 0 to about 60 percent by weight of coating solids present. Preferably, the silica comprises from about 30 to about 50% by weight of coating solids present. The particulate silica can have a size range of from about 1 micron to about 15 microns. Preferably, the silica has a median particle size of from about 2 to about 3 microns and preferably contains less than 33 percent by weight sub-micron sized particles.

The cross-linking agent is admixed with the partially hydrolyzed acrylic polymer in an amount of from about 0.5 to about 10 percent by weight of total coating solids present. Preferably, the cross-linking agent is present in an amount of from about 2.5 to 3.5 percent by weight of total coating solids.

The second coating is preferably placed on the first coating utilizing the process described above, i.e., spray coating the particulate solid chemical while simultaneously fluidizing the solid chemical with a hot gas. The hydrophilic polymer is preferably present in the second coating in a selected amount within the range of from about 5% to about 50% by weight of the encapsulated chemical. By varying the specific amount of polymer within the above range, the time required for the second coating to allow the diffusion of water into the coating and the diffusion of a solution of the encapsulated chemical out of the coating can be varied. As will be understood by those skilled in the art, laboratory tests are conducted to determine specific release times for the polymer coating in specific amounts.

When an encapsulated particulate solid chemical is unavailable except in very small size, the high mechanical shear to which the encapsulated particles are subjected causes rupture of the coatings and premature release of the chemical. In order to overcome this problem, an aqueous solution of the chemical to be encapsulated is spray-dried onto a carrier material of appropriate size. The coating process described above is then applied to the carrier material. The ultimate particle size after the second coating should be in the range of 10 to 50 mesh, U.S. Sieve Series, or 300 to 900 microns in diameter. The total amount of the carrier material can range from about 20% to 40% by weight of the total encapsulated material. Examples of carrier materials which can be used include diatomaceous earth, ceramic beads, silica, alumina, zeolites and polystyrene beads, with silica being preferred.

An example of an encapsulated hygroscopic water soluble particulate solid chemical of this invention is a calcium chloride cement set and strength accelerator encapsulated with a first coating of styrene-butadiene rubber latex and a second coating of partially hydrolyzed acrylic polymer cross-linked with an aziridine prepolymer wherein the amounts of styrene-butadiene rubber latex in the first coating and cross-linked partially hydrolyzed acrylic polymer in the second coating are within the above mentioned quantitative ranges. Another example of an encapsulated calcium chloride set and strength accelerator of this invention is calcium chloride having a first coating of sparingly soluble calcium carbonate and a second coating of partially hydrolyzed acrylic polymer cross-linked with an aziridine prepolymer, the coatings being present within the ranges of amounts set forth above.

The improved methods of this invention for cementing pipe strings in well bores are basically comprised of the following steps. A cement composition comprising a hydraulic cement, water and a controlled time release encapsulated cement set and strength accelerating chemical is prepared. The encapsulated set and strength accelerating chemical includes a first coating of a dry hydrophobic or sparingly soluble material formed thereon and a second coating of a porous cross-linked hydrophilic polymer which releases the set and strength accelerating chemical in a known time formed on the first coating. After preparation, the cement composition is placed in the annulus between the pipe string and the well bore. Thereafter, the cement composition is allowed to set into a hard impermeable mass therein.

The set and strength accelerating chemical utilized in the above described method can be deliquescent, hygroscopic or non-hygroscopic and the materials used to form the first and second coatings are preferably selected from those described above. A presently preferred cement set and strength accelerating chemical for use in accordance with the methods of this invention is hygroscopic calcium chloride which, as described above, preferably includes a first coating formed of styrene-butadiene rubber latex and a second coating formed of partially hydrolyzed acrylic polymer cross-linked with an aziridine in the amounts set forth above.

The present invention provides an improved method of dissolving drilling fluid filter cake and the like in well bores penetrating subterranean producing formations. Oil and gas wells are commonly drilled utilizing water or oil based drilling fluids. During the drilling process, substantial damage to the well bore surfaces adjacent to producing formations takes place. The damage is in the form of drilling fluid filter cake and gelled drilling fluid build-up on the surface of the well bore and in the near-well bore porosity of the adjacent producing formations. Unless removed, the presence of the filter cake hinders the flow of oil and gas from the producing formations into the well bore. Heretofore, after drilling has been completed, the filter cake and gelled drilling fluid in the well bore and adjacent producing formations has been removed by circulating an aqueous acid solution such as aqueous hydrochloric acid through the well bore and into contact with the filter cake and gelled drilling fluid whereby they are dissolved. The aqueous acid solution must include film forming corrosion inhibitors to prevent corrosion of metal surfaces into which the acid comes into contact. The method of this invention using encapsulated acid or an acid forming chemical prevents the metal surfaces from being contacted with an aqueous acid solution before the solution becomes spent.

The improved method for dissolving drilling fluid filter cake and the like are comprised of the following steps. A cleaning composition is prepared comprised of water and a controlled time release encapsulated solid acid or an acid forming chemical. The encapsulated solid acid includes a first coating of a dry hydrophobic film forming material or a sparingly soluble material and a second coating of a porous hydrophilic polymer. The cleaning composition including the encapsulated acid or acid forming chemical is placed in the well bore adjacent to the subterranean formations to be cleaned. Thereafter, when the encapsulated acid or acid forming chemical is released, it reacts with and dissolves the filter cake and the like in the well bore and adjacent subterranean formations.

An example of a solid acid which can be utilized in accordance with the above described method is sulfamic acid.

In order to further illustrate the encapsulated chemicals and methods of the present invention, the following examples are given.

EXAMPLE 1

Preparation of Acrylic Polymer Coated Calcium Chloride

About 5000 grams of –10 mesh (U.S. Sieve Series) calcium chloride pellets obtained from Dow Chemical Company were placed in a Glatt WSG 5 fluidized bed apparatus. The Glatt unit was set up to provide top spray by insertion of a top spray insert and a 10 micron filter bag was utilized. The spray nozzle was placed in the lower position on the top spray insert. A 1.2 mm nozzle was utilized. The air used to fluidize the calcium chloride was conditioned to remove water vapor in the air. The relative humidity was decreased below 7.0% (dew point was less than 32° F.). The coating material was applied at a coating material temperature of 100–105° F., an atomizing air pressure of 37 psi, and a spray flow rate of 50–75 g/min. After the coating material was applied, the encapsulated calcium chloride was heated to a temperature of about 100° F. for a period of about 10 minutes and then cooled to room temperature. The coating material was prepared by adding 1,032.2 grams of water to 5,074.2 grams of a partially hydrolyzed acrylic polymer/silica mixture. The mixture contained 26.8% silica, by weight, and 28.4% polyacrylate resin. Thereafter, 143.4 grams of a cross-linker comprising an aziridine prepolymer was added to the mixture and the coating material was then applied. Using the cross-linked polymer material, an encapsulated product was produced having 36% by weight polymer coating. Samples were removed at 20%, 28% and 36% coating by weight.

EXAMPLE 2

Release of Prior Art Acrylic Polymer Coated Calcium Chloride at Room Temperature The release of the calcium chloride was determined by following the release of chloride ion ($Cl^-$) using a $Cl^-$ selective electrode. All electrode potential determinations were conducted using a Cole-Parmer Benchtop pH Meter (standard meter, model No. 59003-00). The Cl⁻ electrode was an Orion ionplus Chloride Electrode (Orion No. 9617BN). The electrode was filled with ionplus B reference electrode filling solution (Orion No. 900062). An automatic, temperature, compensation probe (ATC) was used in all determinations.

In order to construct a calibration curve, standards ranging from 3,550 ppm Cl⁻ to 100 ppm Cl⁻ were prepared. The 3,550 ppm Cl⁻ standard was used to set the electrode potential to 0.0 mV (rel mV). The standards were prepared in 4-oz. screw top jars. Each jar was placed on an electronic balance and tarred. Either Orion ionplus 0.1 M Cl⁻ standard (Orion No. 941706) or Orion ionplus 1000 ppm Cl⁻ standard (Orion No. 941708) was added to the approximate weight required. The actual weight of standard added was recorded. Ultra-pure DI water was added to the approximate value of the dilution required. The actual diluted weight was recorded. Using a proper sized disposable pipet, 5-M sodium nitrate (NaNO₃) was added to the jar. When 100 g of standard was prepared 2.0 mL was added, and when 50 g of standard was prepared 1.0 mL was added. The jars were sealed with a cap and mixed.

The meter was calibrated before each experiment. Into the standard A (3,550 ppm) was added the Cl⁻ electrode and ATC probe. The meter reading was allowed to equilibrate while the standard was swirled. After the meter equilibrated, the meter was standardized to 0.0 rel mV. The rel mV of the successive standards were determined by first cleaning the electrode with DI water, immersing the electrode and ATC probe in the standards, and swirling until a stable reading was obtained. The readings were recorded, then plotted on semi-log graph with the aid of the spreadsheet program Excel for Window NT 4.0. A linear least square fit was calculated by the spreadsheet to describe the straight line by the following equation (eq. 1):

$$\text{rel mV} = m \ln(\text{ppm Cl}^-) + b \quad \text{eq. 1}$$

m=slope of the line
b=intercept of the line

Using an analytical balance (±0.0001 g capacity), a 0.4 to 0.5 g sample was measured, and the actual weight was recorded. Using an electronic balance (±0.01 g capacity), approximately 100 g of a 0.1% ultra-pure DI water solution of a blend of nonionic surfactants, i.e., nonyl phenol ethoxylates in a solvent mixture, was added into a 250-mL beaker with a magnetic stirring bar. The actual weight of solution added was recorded. The beaker was placed on a magnetic stirrer, and the solution was stirred. The electrode and probe were immersed into the solution. After the meter reading stabilized, the sample was added to the beaker. A stopwatch was started, and the indicated times the rel mV were recorded. The data from the electrode was converted to ppm Cl⁻ released by inserting the values of m and b from the calibration curve into the equation below (eq. 2). From the ppm Cl⁻ released, the percent calcium chloride released was calculated. The results are tabulated in Table I.

$$\text{ppm } Cl^- = e^{[(\text{rel mV} - b)/m]} \quad \text{eq. 2}$$

TABLE I

| Calcium Chloride Released (%) At Room Temperature | | | |
|---|---|---|---|
| Time (min) | 20% Acrylate | 28% Acrylate | 36% Acrylate |
| 0.5 | 2.8 | 6.4 | 7.3 |
| 1.0 | 4.6 | 18.8 | 15.1 |
| 2.0 | 7.8 | 26.1 | 20.6 |
| 3.0 | 10.6 | 28.9 | 23.9 |
| 4.0 | 14.2 | 30.7 | 25.2 |
| 5.0 | 17.9 | 33.0 | 26.6 |
| 10 | 33.9 | 37.2 | 31.2 |
| 15 | 46.8 | 39.0 | 35.8 |
| 20 | 57.3 | 40.8 | 42.2 |
| 30 | 74.3 | 45.9 | 47.7 |
| 40 | 85.8 | 52.8 | 50.9 |
| 60 | 92.7 | 58.7 | 61.0 |
| 90 | 98.6 | 67.0 | 68.3 |
| 120 | 99.1 | 71.6 | 72.0 |
| overnight | — | 83.9 | 86.2 |

From the results of Table I, it can be seen that the release control from the prior art acrylic polymer coating was poor.

EXAMPLE 3

Preparation of Styrene-butadiene (SBR) Coating

Into a container was added 14,166.2 g of SBR latex (available from Mallard Creek Polymers as a 50% solids latex). The latex was diluted to 45% solids by the addition of 1,746.9 g of tap water. Using an overhead stirrer, the mixture was stirred for five minutes. The stirrer rate was adjusted to minimize the production of foam. A polyether modified polysiloxane copolymer (available from BYK-Chemie) was added to improve the leveling of the coating during application. A total of 146.9 g of the copolymer was added. The resulting mixture was stirred for an additional one hour.

EXAMPLE 4

Preparation of SBR and Acrylic Polymer Coated Calcium Chloride

About 5000 grams of −10 mesh (U.S. Sieve Series) calcium chloride pellets obtained from (Dow Chemical Company) were placed in a Glatt WSG 5 fluidized bed apparatus. The Glatt unit was set up to provide top spray by insertion of a top spray insert and a 10 micron filter bag was utilized. The spray nozzle was placed in the lower position on the top spray insert. A 1.2 mm nozzle was utilized. The air used to fluidize the calcium chloride was conditioned to remove water vapor in the air. The relative humidity was decreased below 7.0% (dew point was less than 32° F.). The coating material was applied at a coating material temperature of 92–96° F., an atomizing air pressure of 37 psi, and a spray flow rate of 35–50 g/min. After the coating material was applied, the encapsulated calcium chloride was heated to a temperature of about 110° F. for a period of about 10 minutes and then cooled to room temperature. A total of 2,116.4 g of the SBR coating prepared in Example 3 was applied. Using the above formulation, an encapsulated calcium chloride product was produced having 16% by weight coating. Samples were removed at 8%, 12% and 16% coating by weight.

The procedure outlined in Example 1 was used to apply 36% by weight acrylic polymer coating to a portion of the SBR coated calcium chloride prepared as described above. The Glatt was charged with 5,500 grams of the SBR coated calcium chloride. The acrylic polymer coating was prepared by adding 1,135.5 grams of water to 5,581.7 grams of a partially hydrolyzed polyacrylate/silica mixture. The mixture contained 26.8% silica by weight and 28.4% polyacrylate resin. Thereafter, 157.8 grams of a cross-linker comprising an aziridine prepolymer was added to the mixture and the coating was then applied. Using the above cross-linked polymer material, an encapsulated product was produced having 36% by weight coating. Samples were removed at 20%, 28% and 36% coating by weight.

EXAMPLE 5

Release of SBR Coated Calcium Chloride at Room Temperature

The procedure outlined in Example 2 was utilized. The results are outlined in Table II.

TABLE II

| | Calcium Chloride Released (%) | | | |
|---|---|---|---|---|
| Time (min) | 0% SBR | 8% SBR | 12% SBR | 16% SBR |
| 0.5 | 23.8 | 7.0 | 4.3 | 2.8 |
| 1.0 | 53.1 | 16.9 | 9.7 | 7.2 |
| 2.0 | 88.1 | 44.2 | 19.1 | 15.9 |
| 3.0 | 97.5 | 67.7 | 29.7 | 24.6 |
| 4.0 | 98.6 | 80.8 | 41.1 | 32.3 |
| 5.0 | 98.6 | 87.8 | 50.9 | 40.0 |
| 7.0 | 100 | 91.9 | 69.1 | 54.4 |
| 10 | — | 94.5 | 87.4 | 69.0 |
| 15 | — | — | 93.7 | 80.3 |
| 20 | — | — | 93.7 | 85.9 |

From Table II, it can be seen that the release control from the SBR coating was poor, i.e., that a coating of SBR only is not effective in the release control of calcium chloride.

EXAMPLE 6

Release of SBR and Acrylic Polymer Coated Calcium Chloride at 150° F. in 0.1% Ca(OH)$_2$ The general procedures outlined in Example 2 were used except new standards were used. These standards ranged from 1,778 ppm to 10 ppm. The 1000.0 ppm standard was used to set the electrode potential to 0.0 mV.

The soak solution, 0.1% Ca(OH)$_2$, was prepared by adding 1.0 L of ultra pure DI water to a 2-L glass beaker. While stirring with a magnetic stirring bar, about 1-g of Ca(OH)$_2$ (hydrated lime) was added. After the Ca(OH)$_2$ dissolved, 0.1 mL of an ultra-pure DI water solution of a blend of non-ionic surfactants was added, i.e., nonyl phenol ethoxylates in a solvent mixture. The solution was transferred to a 1-L Nalgene plastic bottle.

The following procedure was used to perform the release test. 8 oz. screw top jars were used. Each jar was filled with 0.1% Ca(OH)$_2$ soak solution (see below) to the 200 mL mark. The jar was placed on the electronic balance, and the weight of solution added was measured. The jar was capped, then placed into a constant temperature water bath preheated to the test temperature. Using the electronic balance, approximately 2.4 g samples were measured, and the amount measured was recorded. After the soak solution heated, the sample was added. The jar was capped and swirled to wet the beads. At the indicated times, an approximate 10 mL aliquot was removed with a disposable pipet. The aliquot was transferred into a tarred 4 oz. jar. The weight of the aliquot was determined on the electronic balance. To the aliquot was added 1.0 mL of 0.5 N NaNO$_3$, and the aliquot was diluted to approximately 50 g with ultra-pure DI water. The weight of the aliquot and the dilution weight were recorded. To the sample was added 1.0 mL of 5 M NaNO$_3$. The electrode potential of the sample was determined by first cleaning the electrode with DI water, immersing the electrode and ATC probe in the sample, and swirling until a stable reading was obtained. The readings were recorded. The data was tabulated in Microsoft Excel for Windows NT 4.0, and the program calculated ppm Cl$^-$ released by inserting the values of m and b from the calibration curve into eq. 2. The results are tabulated in Table III.

TABLE III

| | Calcium Chloride Released (%) | | |
|---|---|---|---|
| Time (hr:min) | 20% Acrylate | 28% Acrylate | 36% Acrylate |
| 0:15 | 1.87 | 0.57 | 0.21 |
| 0:30 | 4.22 | 1.14 | 0.34 |
| 1:00 | 10.6 | 2.92 | 0.63 |
| 1:30 | 17.0 | 3.07 | 0.83 |
| 2:10 | 25.0 | 4.67 | 1.12 |
| 2:31 | 30.7 | 5.71 | 1.29 |
| 3:00 | 37.7 | 8.16 | 1.73 |
| 4:30 | 58.3 | 21.5 | 6.01 |
| 6:00 | 73.2 | 38.8 | 12.9 |
| 19:00 | 100 | 99 | 90 |

From Table III, it can be seen that the release control from the SBR and acrylic polymer coatings was good.

EXAMPLE 7

Preparation of Carbonate and Acrylic Polymer Coated Calcium Chloride

About 4,000 grams of −10 mesh (U.S. Sieve Series) calcium chloride pellets obtained from Dow Chemical Company were placed in a Glatt WSG 5 fluidized bed apparatus. The Glatt unit was set up to provide top spray by insertion of a top spray insert and a 80 mesh screen as the top filter was utilized. The spray nozzle was placed in the lower position on the top spray insert. A 1.2 mm nozzle was utilized. The air used to fluidize the calcium chloride was conditioned to remove water vapor in the air. The relative humidity was decreased below 7.0% (dew point was less than 32° F.). The sodium carbonate solution was applied at a coating material temperature of 108–113° F., an atomizing air pressure of 40 psi, and a spray flow rate of 34–39 g/min. After the coating material was applied, the encapsulated calcium chloride was cooled to room temperature. A total of 1,777.2 g of a 25% by weight solution of sodium carbonate in tap water was applied. Using the above formulation, a carbonate coated product was produced having 10% by weight sodium carbonate.

The procedure outlined in Example 1 was used to apply a 36% by weight acrylic polymer coating to a portion of the above carbonate coated product. The Glatt was charged with 4,000 grams of product. The acrylic polymer coating was prepared by adding 1,032.2 grams of water to 5,074.2 grams of the partially hydrolyzed polyacrylate/silica mixture. The mixture contained 26.8% silica by weight, and 28.4% polyacrylate resin. Thereafter, 143.4 grams of a cross-linker comprising an aziridine prepolymer was added to the mixture and the coating then was applied. Using the cross-linked polymer material, an encapsulated product was produced having 36% by weight polymer coating. Samples were removed at 20%, 28% and 36% coating by weight.

EXAMPLE 8

Release of Carbonare and Acrylic Polymer Coated Calcium Chloride at 150° F. in 0.1% Ca(OH)$_2$ The procedures outlined in Example 6 were used. The results are tabulated in Table IV.

TABLE IV

| | Calcium Chloride Released (%) | | |
|---|---|---|---|
| Time (hr:min) | 20% Acrylate | 28% Acrylate | 36% Acrylate |
| 0:15 | 5.94 | 0.38 | 0.16 |
| 0:30 | 9.24 | 0.61 | 0.26 |
| 1:00 | 15.8 | 1.06 | 0.37 |
| 1:30 | 23.1 | 1.47 | 0.48 |
| 2:00 | 28.2 | 2.20 | 0.53 |
| 3:00 | 39.5 | 4.50 | 0.85 |
| 4:00 | 48.7 | 7.98 | 1.48 |
| 5:00 | 53.8 | 12.5 | 2.32 |
| 6:00 | 56.2 | 17.7 | 3.97 |
| 7:10 | 60.4 | 24.5 | 6.86 |
| 23:00 | 88.9 | 81.28 | 67.2 |

From Table IV, it can be seen that the release control from carbonate and acrylic polymer coatings was good.

EXAMPLE 9

Preparation of SBR and Acrylic Coated Sulfamic Acid

The procedure outlined in Example 4 was used to first apply 16% SBR coating by weight, then add 36% acrylic polymer by weight. The Glatt was charged with 6,000 grams of sulfamic acid screened to −10/+40 mesh. A total of 2,537.0 grams of SBR coating was applied. Samples were removed at 8, 12 and 16% coating by weight. The Glatt was charged with 6,000 grams of the SBR coated product. The acrylic polymer coating was prepared by adding 1,238.8 grams of water to 6,089.1 grams of the partially. hydrolyzed acrylate polymer/silica mixture. The mixture contained 26.8% silica, by weight, and 28.4% polyacrylate resin. Thereafter, 172.1 grams of a cross-linker comprising an aziridine prepolymer was added to the mixture and the coating was then applied. Using the above cross-linked polymer coating, an encapsulated product was produced having 36% by weight coating. Samples were removed at 20%, 28% and 36% coating by weight.

EXAMPLE 10 pH Profile of SBR Coated Sulfamic Acid

All pH measurements were determined using a Cole-Parmer Benchtop pH Meter (standard meter, Model No. 59003-00). An Orion Combination pH electrode (available from Cole-Parmer No. 910600) was used. The meter was calibrated with pH 7.0 and pH 10.01 Buffer solutions. The soak solutions were prepared by the following procedure. To 1.0 L of DI water in a glass beaker was added 0.25 mL of dilute acetic acid, 0.1 mL of an ultra-pure DI water solution of a blend of non-ionic surfactants and 2.0 mL of tetramethylammonium chloride. The mixture was stirred until a solution formed. While stirring, 0.12 g of sodium borate was added to the solution. After the sodium borate dissolved, a pH probe was immersed in the solution. Potassium carbonate solution (47%) was added to the solution dropwise until the pH of the solution was raised to 10.0±0.1.

The tests were run by adding 100 mL of the soak solution into a 250 mL glass beaker containing a magnetic stir bar. The pH electrode and ATC probe were immersed into the solution. The solution was stirred, and after the pH stabilized the sample was added. The pH was recorded versus time. The results are tabulated in Table V.

TABLE V

| | pH | | | |
|---|---|---|---|---|
| Time (min) | 0% SBR | 8% SBR | 12% SBR | 16% SBR |
| 0.0 | 10.16 | 10.24 | 10.24 | 10.23 |
| 0.08 | 6.42 | 10.14 | 10.20 | 9.88 |
| 0.17 | 3.01 | 10.08 | 10.16 | 9.76 |
| 0.25 | 2.64 | 9.86 | 10.13 | 9.68 |
| 0.50 | 2.14 | 9.46 | 10.01 | 9.53 |
| 1.0 | 1.87 | 8.04 | 9.79 | 9.26 |
| 1.5 | 1.66 | 6.25 | 9.58 | 8.97 |
| 2.0 | 1.55 | 5.51 | 9.27 | 8.53 |
| 3.0 | 1.47 | 3.06 | 8.33 | 6.83 |
| 4.0 | 1.43 | 2.54 | 6.81 | 6.45 |
| 5.0 | 1.42 | 2.30 | 6.34 | 6.07 |
| 7.0 | 1.41 | 2.06 | 5.43 | 5.25 |
| 9.0 | — | 1.93 | 4.00 | 4.08 |
| 12 | — | 1.80 | 2.62 | 2.77 |
| 15 | — | 1.73 | 2.39 | 2.43 |
| 20 | — | 1.64 | 2.17 | 2.21 |
| 25 | — | — | 2.04 | 2.07 |
| 30 | — | — | — | 1.99 |

From Table V, it can be seen that the release with SBR coating alone is poor.

EXAMPLE 11

Release of SBR and Acrylic Polymer Coated Sulfamic Acid and Sodium Bisulfate

The releases of sulfamic acid and sodium bisulfate were determined by an acid-base on. The indicator chosen was phenolphthalein. The approximately 0.15 M NaOH (6 grams NaOH/1 L DI H$_2$O) was standardized with potassium hydrogen The soak solution was prepared by adding 1 L DI H$_2$O to a 1 L beaker. While mixing 0.1 mL of an ultra-pure DI water solution of a blend of nonionic surfactants was added followed by a 1% phenolphthalein solution in isopropanol. The mixture was stirred until a slightly hazy solution formed.

Samples were prepared by measuring 20 mL of soak solution into a 125 mL Erlenmeyer flasks. The solutions were allowed to equilibrate to the test temperature in water baths. The test samples encapsulated with 16% SBR and 36% cross-linked acrylic polymer were weighed to the nearest ±0.01 g, then added to the Erlenmeyer flasks. At the times indicated, the samples were titrated to the end point with the NaOH solution. After titration, the samples were replaced into the appropriate bath until the next titration. The results of the room temperature sulfamic acid tests are tabulated in Table VI and at 150° F. in Table VII. The results of the sodium bisulfate tests at various temperatures are shown in Table VIII.

TABLE VI

| | Sulfamic Acid Released (%) | |
|---|---|---|
| Time (hr:min) | 12% Acrylate | 20% Acrylate |
| 0:10 | 1.11 | 0.48 |
| 0:20 | 2.61 | 1.15 |
| 0:30 | 4.71 | 1.81 |
| 0:45 | 9.28 | 2.96 |

TABLE VI-continued

Sulfamic Acid Released (%)

| Time (hr:min) | 12% Acrylate | 20% Acrylate |
|---|---|---|
| 1:00 | 15.4 | 4.61 |
| 1:30 | 28.0 | 9.28 |
| 2:00 | 37.8 | 17.4 |
| 2:30 | 45.0 | 27.6 |
| 3:52 | 56.4 | 49.7 |
| 5:00 | 63.0 | 60.0 |
| 6:00 | 67.5 | 64.6 |
| 7:30 | 72.9 | 70.3 |
| 23:00 | 92 | 89 |

TABLE VII

Sulfamic Acid Released (%)

| Time (hr:min) | 20% Acrylate | 28% Acrylate | 36% Acrylate |
|---|---|---|---|
| 0:20 | 5.30 | 1.95 | 0.86 |
| 0:40 | 14.2 | 4.99 | 1.98 |
| 1:00 | 24.6 | 9.46 | 3.44 |
| 1:30 | 38.6 | 21.3 | 7.91 |
| 2:00 | 48.9 | 31 | 15.7 |
| 2:20 | 54.8 | 36.6 | 21.2 |
| 3:41 | 71.9 | 55.7 | 39.5 |
| 4:20 | 77.0 | 62.6 | 47.2 |
| 5:00 | 80.7 | 68.1 | 54.3 |
| 6:00 | 84.7 | 74.9 | 62.4 |
| 7:30 | 88.8 | 81.9 | 72.4 |
| 23:00 | 96 | 96 | 96 |

TABLE VIII

Sodium Bisulfate Released (%)

| Time (hr:min) | 75° F. | 100° F. | 125° F. | 150° F. | 175° F. |
|---|---|---|---|---|---|
| 0:10 | 1.24 | — | — | — | 3.06 |
| 0:20 | 2.23 | 2.11 | 3.72 | 6.12 | 4.83 |
| 0:30 | 2.85 | — | — | — | — |
| 0:40 | — | 3.68 | 6.59 | 9.36 | 13.0 |
| 1:00 | 4.46 | 4.63 | 8.98 | 13.2 | 22.5 |
| 1:20 | — | 5.56 | 11.3 | — | — |
| 1:30 | 5.70 | — | — | 21.1 | 42.2 |
| 1:40 | — | 6.37 | 14.2 | — | — |
| 2:00 | 6.45 | 7.09 | 17.1 | 29.9 | 57.3 |
| 2:30 | — | 8.43 | 22.6 | 40.2 | — |
| 3:00 | 7.69 | 10.2 | 29.7 | 49.6 | 71.3 |
| 4:00 | 8.68 | 13.9 | 43.6 | 63.4 | — |
| 6:00 | 14.8 | — | — | 75.6 | — |
| 7:30 | 23.3 | 33.9 | 74.4 | — | — |
| overnight | 70.9 | 79.8 | 93.2 | 93.8 | — |

From Tables VI, VII and VIII, it can be seen that the release control from the SBR and acrylic polymer coatings was good.

EXAMPLE 12

Cement Slurry Preparation and Testing Using Encapsulated Calcium Chloride

Method A:

Standard procedure according to API Specification 10 for the preparation of cement slurries using Class H cement, water and encapsulated calcium chloride pellets.

Method B:

Cement and water slurry was made according to API Specification 10, and the encapsulated calcium chloride was added to the slurry while stirring at 4,000 rpm using the Waring blender. The duration of mixing at 4,000 rpm subsequent to the addition of calcium chloride was either 5 or 30 seconds.

Thickening Time Measurements

Thickening times were measured according to API procedures using the slurries prepared according to the above mentioned procedures. The paddle used for stirring was modified in such a way that the calcium chloride pellets could move freely through the gap between the side baffles of the paddle and the wall of the slurry can.

Compressive Strength Measurement Tests

The slurries prepared according to the above procedures were conditioned at the test temperature for 20 minutes in an atmospheric consistometer, and the compressive strengths were measured with "Ultrasonic Cement Analyzer" (UCA) at the test temperature. The paddle used for stirring was modified in such a way that the calcium chloride pellets could move freely through the gap between the side baffles of the paddle and the wall of the slurry can.

EXAMPLE 13

Thickening Time Measurements and Compressive Strength Measurements with Calcium Chloride Encapsulated with SBR and Acrylate Coatings Slurries were prepared according to Method A of Example 12 and tested for thickening times to study the effects of level of the acrylate coating on thickening times. The results are presented in Table IX.

TABLE IX

Effect of % Coating on Thickening Time (API Mixing Procedure)[1]

| Slurry No. | Temp., ° F. | % Active CaCl$_2$ (bwoc) | Coating System | % Polymer Coating | % Retarder[2] | Thickening Time, hr:min |
|---|---|---|---|---|---|---|
| 1 | 90 | 2 | — | None | — | 2:00 |
| 2 | 90 | 2 | SBR/acryl | 20 | — | 1:50 |
| 3 | 90 | 2 | SBR/acryl | 36 | — | 2:50 |
| 4 | 180 | None | None | — | 0.3% HR-5 | 3:10 |
| 5 | 180 | 2 (Neat) | — | None | 0.5% HR-5 | 3:15 |
| 6 | 180 | 2 | SBR/acryl | 20 | 0.4% HR-5 | 3:15 |

TABLE IX-continued

Effect of % Coating on Thickening Time (API Mixing Procedure)[1]

| Slurry No. | Temp., °F. | % Active CaCl$_2$ (bwoc) | Coating System | % Polymer Coating | % Retarder[2] | Thickening Time, hr:min |
|---|---|---|---|---|---|---|
| 7 | 180 | 2 | SBR/acryl | 36 | 0.4% HR-5 | 3:35 |
| 8 | 180 | 2 | Na$_2$CO$_3$/acryl | 36 | 0.4% HR-5 | 2:50 |

[1]CaCl$_2$ was mixed in dry cement (Class H) prior to mixing with water (4.45 gal water/sk)
[2]HR-5 is a lignosulfonate based retarder The results in Table IX show that the encapsulated materials provide increased delay in thickening times with increased acrylate coating.

The compressive strengths were measured for Slurries 1–3 of Table IX and the results are presented in Table X.

TABLE X

UCA Compressive Strength (psi) Development Data at 90° F. for Slurries Mixed According to API Procedure

| Slurry No. | 1 hr. | 3 hr. | 8 hr. | 24 hr. | Time To 50 psi, hr:min | Time To 500 psi, hr:min |
|---|---|---|---|---|---|---|
| 1 | 1 | 310 | 1460 | 2950 | 2:00 | 3:50 |
| 2 | 1 | 400 | 1660 | 3120 | 1:55 | 3:25 |
| 3 | 1 | 370 | 1540 | 2440 | 1:53 | 3:30 |

The results in Table X show that the strength developments are similar for all materials at 90° F. when mixed according to API procedure. However, according to the previous Table, the thickening times are longer for the material with the highest level of the second coating. Thus, at 90° F., longer thickening times are obtained without a loss in the strength development as a result of a thicker second coating.

The compressive strengths at 180° F. were measured for Slurries 4–8 and the results are presented in Table XI.

TABLE XI

UCA Compressive Strength (psi) Development Data at 180° F. for Slurries Mixed According to API Procedure

| Slurry No. | 3 hr. | 8 hr. | 24 hr. | Time To 50 psi, hr:min | Time To 500 psi, hr:min |
|---|---|---|---|---|---|
| 4 | 0 | 350 | 1960 | 7:05 | 8:35 |
| 5 | 0 | 1680 | 2750 | 3:50 | 5:00 |
| 6 | 0 | 1815 | 2550 | 3:50 | 3:55 |
| 7 | 0 | 1540 | 2370 | 3:50 | 4:50 |
| 8 | 0 | 40 | 2580 | 7:50 | 11:30 |

The data in Table XI shows that even though all the slurries listed had similar thickening times, the strength development rates are different. The lowest rate of strength development was noted for Slurry No. 4 which uses only the retarder and no calcium chloride. Slurry No. 8 showed very slow strength development in the initial stages, but at 24 hours, the strength values were comparable to other activated slurries. The data also clearly indicates that the rates of compressive strength development can be modified to suit the need by choosing calcium chloride with combinations of first and second coatings and different thicknesses of the second coating.

EXAMPLE 14

Thickening Time and Compressive Strength Measurments with Encapsulated Calcium Chloride Cement slurries containing encapsulated calcium chloride were prepared according to Method B in Example 12. The thickening time and compressive strength data for these slurries are presented in Tables XII and FIG. 1 respectively.

TABLE XII

Effects of the Order of Addition and Duration of Mixing at Low Shear at Various Temperatures

| Slurry no. | Temp., °F. | % Active CaCl$_2$ (bwoc) | % Polymer (acrylate) coating | HR-5, % bwoc | Duration of Mixing at Shear[1] | Thickening Time hr:min |
|---|---|---|---|---|---|---|
| 1 | 90 | 2 | None | — | None (API Mixing) | 2:00 |
| 3 | 90 | 2 | 36 | — | None (API Mixing) | 2:50 |
| 9 | 90 | 2 | 36 | — | 5 sec. | 4:50 |
| 10 | 90 | 2.52 | 20 | — | 5 sec. | 3:06 |
| 11 | 90 | 2.52 | 20 | — | 30 sec. | 4:15 |
| 13 | 120 | 2 | 36 | — | 5 sec. | 2:10 |

TABLE XII-continued

Effects of the Order of Addition and Duration
of Mixing at Low Shear at Various Temperatures

| Slurry no. | Temp., °F. | % Active CaCl$_2$ (bwoc) | % Polymer (acrylate) coating | HR-5, % bwoc | Duration of Mixing at Shear[1] | Thickening Time hr:min |
|---|---|---|---|---|---|---|
| 14 | 120 | 2 | 36 | — | 30 sec. | 2:40 |
| 15 | 180 | 2 | 36 | — | 5 sec. | 1:00 |
| 16 | 180 | 2 | 36 | — | 30 sec. | 1:20 |
| 17 | 180 | 2 | 36 | 0.4 | 30 sec. | 4:05 |
| 7 | 180 | 2 | 36 | 0.4 | API | 3:35 |

[1]The cement slurry was made in accordance with API procedure, then the encapsulated material was stirred into the slurry followed by shearing the slurry at low shear (4,000 rpm) for the specified period.

The data given in Table XII shows that the addition of the encapsulated calcium chloride pellets subsequent to high shear mixing extends the thickening times compared to when these materials are added prior to high shear mixing. Additionally, the data shows that the duration of mixing at low shear also affects the thickening time, with longer duration of mixing providing longer thickening times. It is believed that when the encapsulated material is added prior to high shear mixing, the coating ruptures because of the shear and prematurely releases the encapsulated material.

TABLE XIII

Compressive Strength Development as a Function Time at 180° F.

| Time in Hours | Slurry #4, psi | Slurry #5, psi | Slurry #7, psi | Slurry #8, psi | Slurry #17, psi |
|---|---|---|---|---|---|
| 4 | 0 | 0 | 50 | 0 | 0 |
| 8 | 50 | 1175 | 1550 | 0 | 175 |
| 12 | 1175 | 1600 | 1825 | 600 | 1600 |
| 16 | 1575 | 1950 | 2125 | 1875 | 2400 |
| 20 | 1750 | 2075 | 2250 | 2350 | 2725 |
| 24 | 1900 | 2175 | 2375 | 2600 | 3000 |
| 28 | 2025 | 2275 | 2450 | 2700 | 3125 |
| 32 | 2100 | 2325 | 2525 | 2850 | 3250 |
| 36 | 2175 | 2375 | 2575 | 2950 | 3400 |
| 40 | 2225 | 2400 | 2625 | 3050 | 3475 |
| 44 | 2275 | 2450 | 2675 | 3125 | 3525 |
| 48 | 2325 | 2475 | 2725 | 3225 | 3600 |

The results given in Table XIII show that with a 36% second coating in the cases of both SBR and calcium carbonate first coatings, the strength development is delayed compared to the slurry containing unencapsulated calcium chloride, and the ultimate strengths, for example at 2 days, are higher than those obtained in the latter case. This results provides for safe placement of slurries and rapid development of compressive strengths.

EXAMPLE 15

Breaking Down Mud Filter Cake with Encapsulated Sulfamic Acid

Encapsulated sulfamic acid was tested for its ability to break down a mud filter cake using the following procedure. The apparatus used for this purpose was the same as that used for fluid loss measurements for cement slurries as described in API Specification for Materials and Testing for Well Cements in Appendix F entitled "Fluid-Loss Test (Tentative)", with the exception that a 35 micron ceramic disc was used to build the mud filter cake. A water based mud was used to build the filter cake at 150° F. The initial fluid loss was measured to be 0.3 mls per minute. The mud was poured out, and the cell was slowly refilled with tap water to about ¼" below the O-ring gland. About 4 grams of sulfamic acid encapsulated with 16% SBR and 36% cross-linked polyacrylate was sprinkled evenly on the water surface. The cell was closed and a pressure of 500 psi was applied and the temperature was raised to 150° F. The fluid loss rate at one hour after the encapsulated acid was added was 12 mls per minute; and the fluid loss after 16 hours was 60 mls per minute.

The above results show that a mud filter cake can be cleaned in a time-dependent manner using the encapsulated acid of the present invention.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. An improved method of cementing a pipe string in a well bore comprising the steps of:
   (a) preparing a cement composition comprising a hydraulic cement, water and a controlled time release encapsulated cement strength and set accelerating chemical having a first coating of a hydrophobic film forming material or a sparingly soluble material which provides a dry shield on said chemical and provides a delay in the release of said chemical for a time period of less than about 2 hours, and a second coating of a porous cross-linked hydrophilic polymer which prevents the substantial dissolution of the resulting encapsulated chemical for a selected period of time;
   (b) placing said cement composition in the annulus between said pipe string and said well bore; and
   (c) allowing said cement composition to set into a hard impermeable mass therein.

2. The method of claim 1 wherein said strength and set accelerating chemical is calcium chloride.

3. The method of claim 1 wherein said hydrophobic film forming material is selected from the group consisting of styrene-butadiene rubber latex, low melting polyolefin waxes, oils, polybutylene and atactic polyolefins.

4. The method of claim 3 wherein said hydrophobic material is present in said first coating in an amount in the range of from about 1% to about 25% by weight of said encapsulated chemical.

5. The method of claim 3 wherein said styrene-butadiene rubber latex is an aqueous suspension of particles of styrene-butadiene copolymers having water in an amount in the range of from about 40% to about 70% by weight of the latex.

6. The method of claim 5 wherein said aqueous suspension further comprises an emulsifier, polymerization catalyst or chain modifying agent.

7. The method of claim 5 wherein the weight ratio of styrene to butadiene in the latex is in the range of from about 10%:90% to 90%:10%.

8. The method of claim 1 wherein said first coating is a dry sparingly soluble material which dissolves in water selected from the group consisting of carbonate, phosphate and sulfate salts of magnesium, barium, calcium and zirconium.

9. The method of claim 8 wherein said dry sparingly soluble material is present in said first coating in an amount in the range of from about 1% to about 25% by weight of said encapsulated chemical.

10. The method of claim 1 wherein said hydrophilic polymer is selected from the group consisting of partially hydrolyzed acrylic polymers.

11. The method of claim 10 wherein said partially hydrolyzed acrylic polymer is cross-linked with a cross-linker selected from the group consisting of aziridine prepolymer and carbodiimide.

12. The method of claim 11 wherein said cross-linker is admixed with the partially hydrolyzed acrylic polymer in an amount of from about 0.5 to about 10% by weight of total coating solids.

13. The method of claim 11 wherein said cross-linked hydrophilic polymer is present in said second coating in an amount in the range of from about 5% to about 50% by weight of said encapsulated chemical.

14. The method of claim 10 wherein said partially hydrolyzed acrylic polymers are admixed with a particulate material.

15. The method of claim 14 wherein said particulate material is silica.

16. The method of claim 1 wherein said porous cross-linked hydrophilic polymer is admixed with a particulate material.

17. The method of claim 16 wherein said particulate material is silica.

18. The method of claim 17 wherein said silica comprises from about 0 to about 60% by weight of coating solids present.

19. The method of claim 17 wherein said silica has a size range of from about 1 micron to about 15 microns.

20. The method of claim 1 wherein said first and second coatings are applied in the presence of a hot fluidizing gas.

21. The method of claim 1 wherein an aqueous solution of said set and strength accelerating chemical is applied to a carrier material prior to being encapsulated.

22. The method of claim 21 wherein said carrier material is selected from the group consisting of diatomaceous earth, ceramic beads, silica, alumina, zeolites and polystyrene beads.

23. The method of claim 1 wherein the encapsulated chemical has a particle size in the range of from about 300 to about 900 microns in diameter after the second coating.

24. The method of claim 1 wherein said cement strength and set accelerating chemical is calcium chloride, said first coating is styrene-butadiene rubber latex and said second coating is partially hydrolyzed acrylic polymer cross-linked with aziridine prepolymer.

25. The method of claim 24 wherein said styrene-butadiene rubber latex is present in said first coating in an amount in the range of from about 1% to about 25% by weight of said encapsulated calcium chloride.

26. The method of claim 24 wherein said cross-linked partially hydrolyzed acrylic polymer is present in said second coating in an amount in the range of from about 1% to about 25% by weight of said encapsulated calcium chloride.

27. The method of claim 1 wherein said first coating is a sparingly soluble material formed by reacting an outer layer of said cement strength and set accelerating chemical with a reactant that forms said sparingly soluble material.

28. The method of claim 27 wherein said cement strength and set accelerating chemical is calcium chloride and said reactant is sodium carbonate which reacts with said calcium chloride to form a sparingly soluble calcium carbonate first coating.

29. The method of claim 1 wherein said cement strength and set accelerating chemical is calcium chloride, said first coating is calcium carbonate and said second coating is partially hydrolyzed acrylic polymer cross-linked with aziridine prepolymer.

30. The method of claim 29 wherein said calcium carbonate is present in said first coating in an amount in the range of from about 1% to about 25% by weight of said encapsulated calcium chloride.

31. The method of claim 29 wherein said cross-linked polyacrylate is present in said second coating in an amount in the range of from about 1% to about 25% by weight of said encapsulated calcium chloride.

* * * * *